US011156162B2

(12) United States Patent
Gandikota et al.

(10) Patent No.: US 11,156,162 B2
(45) Date of Patent: Oct. 26, 2021

(54) FLUID MANIFOLD DAMPER FOR GAS TURBINE ENGINE

(71) Applicant: General Electric Company, Schenectady, NY (US)

(72) Inventors: Gurunath Gandikota, Bangalore (IN); Kwanwoo Kim, Montgomery, OH (US); Hiranya Kumar Nath, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 392 days.

(21) Appl. No.: 15/987,340

(22) Filed: May 23, 2018

(65) Prior Publication Data
US 2019/0360402 A1 Nov. 28, 2019

(51) Int. Cl.
*F02C 7/22* (2006.01)
*F02C 7/24* (2006.01)

(52) U.S. Cl.
CPC ............ *F02C 7/222* (2013.01); *F02C 7/24* (2013.01); *F23R 2900/00014* (2013.01)

(58) Field of Classification Search
CPC .... F02C 7/222; F02C 7/22; F02C 7/24; F23R 2900/00014; F05D 2260/963; F05D 2260/964; F05D 2260/96; F01D 25/04
See application file for complete search history.

(56) References Cited

U.S. PATENT DOCUMENTS

| | | | |
|---|---|---|---|
| 867,757 A | 10/1907 | Ruecker | |
| 3,416,320 A * | 12/1968 | Asher | F02C 7/22 60/208 |
| 3,501,914 A * | 3/1970 | Asher | F02C 3/20 60/39.461 |
| 3,768,251 A * | 10/1973 | Camboulives | F23R 3/283 60/796 |
| 3,793,838 A | 2/1974 | Nash | |
| 3,991,561 A * | 11/1976 | Leto | F02C 7/222 60/39.463 |
| 4,402,184 A * | 9/1983 | Faulkner | F02C 7/222 60/739 |
| 4,862,693 A | 9/1989 | Batakis et al. | |
| 5,119,636 A * | 6/1992 | Batakis | F23R 3/283 60/739 |
| 5,168,698 A | 12/1992 | Peterson et al. | |

(Continued)

FOREIGN PATENT DOCUMENTS

| | | |
|---|---|---|
| GB | 2515028 A | 12/2014 |
| WO | WO2011117533 A2 | 9/2011 |
| WO | WO2014/052221 A1 | 4/2014 |

OTHER PUBLICATIONS

U.S. Appl. No. 15/486,872, filed Apr. 13, 2017.

(Continued)

*Primary Examiner* — William H Rodriguez
(74) *Attorney, Agent, or Firm* — Venable LLP; Elizabeth C. G. Gitlin; Michele V. Frank

(57) ABSTRACT

A fluid manifold assembly for a gas turbine engine, the fluid manifold assembly including a walled conduit assembly defining a fluid passage therewithin. The fluid passage defines a pair of ends separated by a length. A connecting conduit is coupled to the end of the fluid passage and to the length of the fluid passage.

17 Claims, 4 Drawing Sheets

(56) References Cited

U.S. PATENT DOCUMENTS

| | | | | |
|---|---|---|---|---|
| 5,211,005 | A | * | 5/1993 | Hovnanian .............. F02C 7/22 60/739 |
| 5,263,314 | A | * | 11/1993 | Anderson ............... F02C 7/222 137/312 |
| 5,273,249 | A | | 12/1993 | Peterson et al. |
| 5,369,952 | A | | 12/1994 | Walters |
| 6,189,321 | B1 | * | 2/2001 | Banhardt ................ F02C 7/222 60/39.281 |
| 6,339,924 | B1 | * | 1/2002 | Hoyer ..................... F02C 7/00 60/39.094 |
| 6,367,240 | B1 | * | 4/2002 | Hoyer ..................... F01D 9/06 60/785 |
| 6,487,860 | B2 | * | 12/2002 | Mayersky ............... F02C 7/222 285/386 |
| 6,536,457 | B2 | | 3/2003 | Dooley |
| 7,302,802 | B2 | | 12/2007 | Alkabie |
| 7,337,875 | B2 | | 3/2008 | Proscia et al. |
| 7,350,357 | B2 | | 4/2008 | Chen et al. |
| 7,533,534 | B2 | | 5/2009 | Alkabie |
| 7,549,290 | B2 | | 6/2009 | Holt et al. |
| 7,805,943 | B2 | | 10/2010 | Desaulty et al. |
| 7,856,830 | B2 | | 12/2010 | Alkabie |
| 7,857,094 | B2 | | 12/2010 | Macquisten et al. |
| 7,926,278 | B2 | | 4/2011 | Gerendas et al. |
| 7,874,159 | B2 | | 6/2011 | Gerendas et al. |
| 8,024,934 | B2 | | 9/2011 | Abreu et al. |
| 8,037,688 | B2 | | 10/2011 | Hagen et al. |
| 8,234,873 | B2 | | 8/2012 | Houtman et al. |
| 8,701,420 | B2 | | 4/2014 | Nomura et al. |
| 8,733,496 | B2 | | 5/2014 | Ono et al. |
| 8,931,588 | B2 | | 1/2015 | Murray |
| 9,732,960 | B2 | | 8/2017 | Cutler |
| 9,784,187 | B2 | | 10/2017 | Wolfe et al. |
| 2009/0038684 | A1 | * | 2/2009 | Chatfield ............ F04B 11/0091 137/1 |
| 2009/0084450 | A1 | * | 4/2009 | Shade ..................... F16L 55/04 137/599.01 |
| 2009/0194485 | A1 | * | 8/2009 | Colotte ................ B01D 35/143 210/741 |
| 2010/0111713 | A1 | * | 5/2010 | Chatfield .............. F04B 39/123 417/53 |
| 2010/0146928 | A1 | * | 6/2010 | Morenko ............... F02C 7/222 60/39.094 |
| 2011/0048021 | A1 | * | 3/2011 | Slobodyanskiy ......... F02C 7/24 60/725 |
| 2011/0146807 | A1 | * | 6/2011 | Bassmann ............... F02C 7/232 137/15.05 |
| 2011/0232288 | A1 | | 9/2011 | Bizouard et al. |
| 2012/0167574 | A1 | | 7/2012 | Uskert |
| 2012/0240583 | A1 | | 9/2012 | Penz et al. |
| 2012/0291896 | A1 | * | 11/2012 | Shade ............... F16L 55/02763 137/599.01 |
| 2013/0019602 | A1 | * | 1/2013 | Kim ........................ F23R 3/286 60/725 |
| 2013/0042627 | A1 | | 2/2013 | Gerendas et al. |
| 2013/0283799 | A1 | | 10/2013 | Carey et al. |
| 2014/0083111 | A1 | | 3/2014 | Gregg et al. |
| 2014/0109591 | A1 | | 4/2014 | Bothien et al. |
| 2014/0245746 | A1 | | 9/2014 | Srinivasan et al. |
| 2015/0021117 | A1 | | 1/2015 | Rupp et al. |
| 2015/0176496 | A1 | * | 6/2015 | Zordan ................... F02C 7/228 60/739 |
| 2015/0315968 | A1 | * | 11/2015 | Roman .................... F02C 7/22 60/739 |
| 2015/0315969 | A1 | * | 11/2015 | Fisher .................... F02C 7/222 60/739 |
| 2015/0322862 | A1 | * | 11/2015 | Fuller .................... F02C 7/222 60/739 |
| 2015/0361884 | A1 | * | 12/2015 | Kramer ................... F02C 7/222 60/772 |
| 2016/0076772 | A1 | | 3/2016 | Metternich et al. |
| 2016/0167801 | A1 | * | 6/2016 | Haskins ............. F02M 37/0052 60/772 |
| 2017/0009996 | A1 | * | 1/2017 | Kim ........................ F23N 1/005 |
| 2017/0051671 | A1 | * | 2/2017 | Chalaud .................... F02C 9/36 |
| 2017/0065986 | A1 | * | 3/2017 | Goulds ................... F02C 7/222 |
| 2017/0153027 | A1 | * | 6/2017 | Yang ........................ F02C 7/24 |
| 2017/0175638 | A1 | * | 6/2017 | Mahadik ................ F02C 7/222 |
| 2017/0248318 | A1 | | 8/2017 | Kulkarni |
| 2017/0342912 | A1 | * | 11/2017 | Kim ........................ F23R 3/346 |
| 2018/0038280 | A1 | * | 2/2018 | Rogero ................... B64D 15/02 |
| 2018/0058404 | A1 | * | 3/2018 | Tibbs .................... F02M 61/167 |
| 2018/0156126 | A1 | * | 6/2018 | Snyder ................... F02C 7/228 |
| 2018/0266691 | A1 | * | 9/2018 | Sweeney .................. F02C 3/06 |
| 2018/0298825 | A1 | * | 10/2018 | Han ........................ F23R 3/28 |
| 2019/0195134 | A1 | * | 6/2019 | Kantany ................. F02C 7/232 |
| 2019/0309686 | A1 | * | 10/2019 | Ryon ..................... F23R 3/283 |
| 2020/0040821 | A1 | * | 2/2020 | Yeager ..................... F02C 9/50 |
| 2020/0116086 | A1 | * | 4/2020 | D'Alessandro ......... F02C 7/236 |

OTHER PUBLICATIONS

U.S. Appl. No. 15/468,172, filed Mar. 24, 2017.

Bellucci et al., Thermoacoustic Modeling of a Gas Turbine Combustor Equipped With Acoustic Dampers, ASME Turbo Expo 2004: Power for Land, Sea, and Air, vol. 1, Vienna, Austria, Jun. 14-17, 2004, pp. 635-644.

Gaeta et al., Design and Experimental Validation of a Model-Based Injection Pressure Controller in a Common Rail System for GDI Engine, 2011 American Control Conference on O'Farrell Street, San Francisco, CA, Jun. 29-Jul. 1, 2011, pp. 5273-5278.

* cited by examiner

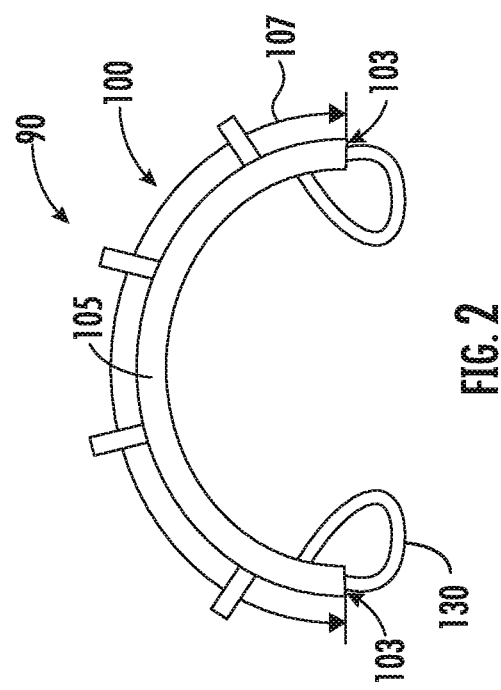
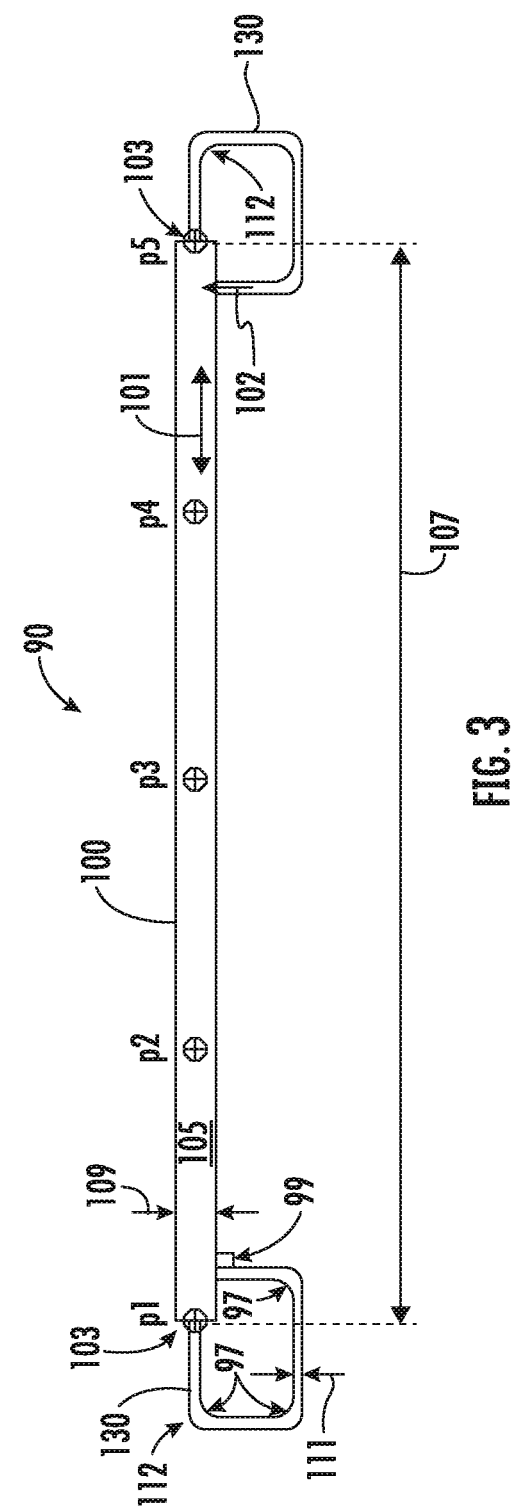

FLUID MANIFOLD DAMPER FOR GAS TURBINE ENGINE

FIELD

The present subject matter relates generally to gas turbine engine fluid manifold assemblies. More particularly, the present subject matter relates to damping structures for gas turbine engine fluid manifold assemblies.

BACKGROUND

Gas turbine engines generally include combustion systems receiving fuel from a fluid manifold assembly coupled to a plurality of fuel nozzles. The fluid manifold assembly may experience high amplitude dynamics (e.g., pressure oscillations, vibrations, harmonics) under various engine operating conditions due to a flow or pressure of the fuel through the fluid manifold assembly, pressure oscillations from the combustion system, and/or dynamics such as vibrations, noise, or harmonics from the engine in general. For example, engine operating conditions may include those defined by a landing/take-off cycle (LTO) for aviation engines or similar ranges for industrial, marine, auxiliary power unit, turboprop or turboshaft configurations. Engine operating conditions may include a generally lower power ignition/start-up and idle operation, a generally higher power take-off and climb condition, and other power conditions in between, such as cruise and approach. As an engine operates across these and other various operating conditions, fuel pressure and flow through the fluid manifold assembly to the combustion system varies, which may result in one or more resonance conditions that may disrupt fuel flow to the combustion system and adversely affect engine operation, up to and including loss of combustion. Unmitigated fluid manifold assembly dynamics may also result in structural damage to the fluid manifold assembly.

Pressure oscillations generally occur in combustion systems of gas turbine engines resulting from the combustion of a fuel and air mixture within a combustion chamber. While nominal pressure oscillations are a byproduct of combustion, increased magnitudes of pressure oscillations may result from generally operating a combustion system at lean conditions, such as to reduce combustion emissions, or a coupling between unsteady heat release and acoustic/pressure fluctuation, the overall acoustics of the combustion system, and transient fluid dynamics within the combustor. High magnitude pressure oscillations may propagate to the fluid manifold assembly. These pressure oscillations may result in intense, single-frequency or multiple-frequency dominated acoustic waves that may propagate within the combustion system and to the fluid manifold assembly, thereby inducing vibrations in the fluid manifold assembly that may result in oscillations in a flow or pressure of fuel within the fluid manifold assembly. Alternatively, oscillation of the fuel flow or pressure may propagate from the fluid manifold assembly to the fuel nozzles and aggravate pressure oscillations inside the combustion system. Low frequency acoustic waves, such as those that occur during engine startup and/or during a low power to idle operating condition, and/or higher frequency waves, which may occur at other operating conditions, may reduce operability margin of the engine, may increase external combustion noise, vibration, or harmonics, or induce loss of flame. Increased pressure oscillations may damage combustion systems or accelerate structural degradation of the combustion system, the fluid manifold assembly, or the engine in general, thereby resulting in engine failure or increased engine maintenance costs.

Therefore, there exists a need for a system for damping fluid manifold assemblies to attenuate dynamics at the engine that may mitigate losses in operability margin, increases in noise, vibration, or harmonics, or structural degradation of the fluid manifold, combustion system, or the engine.

BRIEF DESCRIPTION

Aspects and advantages of the invention will be set forth in part in the following description, or may be obvious from the description, or may be learned through practice of the invention.

An aspect of the present disclosure is directed to a fluid manifold assembly for a gas turbine engine, the fluid manifold assembly including a walled conduit assembly defining a fluid passage therewithin. The fluid passage defines a pair of ends separated by a length. A connecting conduit is coupled to the end of the fluid passage and to the length of the fluid passage.

In one embodiment, the connecting conduit is coupled substantially perpendicularly to the length of the fluid passage.

In another embodiment, the connecting conduit defines at least one substantially 90 degree bend.

In yet another embodiment, the walled conduit defines a first diameter and the connecting conduit defines, at least in part, a second diameter. The second diameter is between approximately 0.2 to approximately 1.5 times the first diameter.

In still another embodiment, the connecting conduit defines, at least in part, a tapered geometry defining a plurality of diameters at the connecting conduit.

In still yet another embodiment, the connecting conduit defines a parametric oscillator.

In various embodiments, the walled conduit assembly further includes a first walled conduit defining a first fluid passage therewithin, in which the first fluid passage defines a pair of first ends separated by a first length. The walled conduit assembly further includes a second walled conduit defining a second fluid passage therewithin in which the second fluid passage defines a pair of second ends separated by a second length. The connecting conduit is coupled to the first walled conduit and the second walled conduit in fluid communication between the first fluid passage and the second fluid passage.

In one embodiment, the connecting conduit is coupled to the first end of the first walled conduit and the second length of the second walled conduit.

In another embodiment, the connecting conduit is coupled to the second end of the second walled conduit and the first length of the first walled conduit.

In yet another embodiment, the first length is an integer multiple or fraction of the second length.

Another aspect of the present disclosure is directed to a gas turbine engine including a combustion system and the fluid manifold assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 2-6 are exemplary embodiments of the fluid manifold assembly of the engine shown in FIG. 1.

Figure 1:
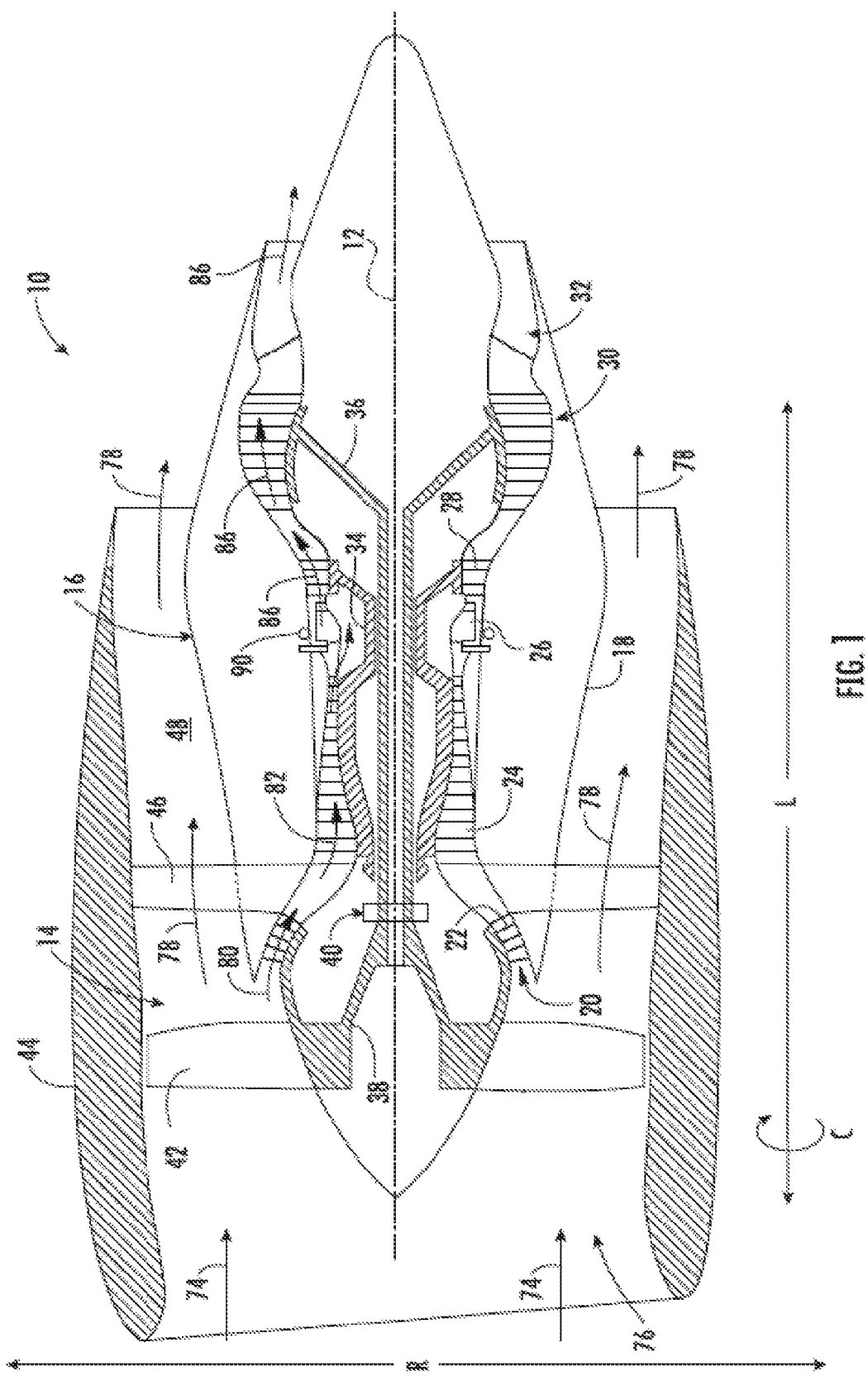
FIG. 1 is a schematic cross sectional view of an exemplary gas turbine engine incorporating an exemplary embodiment of a fluid manifold assembly and damper.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of a fluid manifold assembly are generally provided that may attenuate fluid manifold assembly dynamics across engine conditions. The various embodiments of the fluid manifold assembly generally provided herein may attenuate dynamics (e.g., vibrations, noise, harmonics, etc.) as fluid flow and/or pressure changes across various engine conditions or as combustion dynamics change.

Referring now to the drawings, FIG. 1 is a schematic partially cross-sectioned side view of an exemplary high by-pass turbofan engine 10 herein referred to as "engine 10" as may incorporate various embodiments of the present disclosure. Although further described below with reference to a turbofan engine, the present disclosure is also applicable to turbomachinery in general, including turbojet, turboprop, and turboshaft gas turbine engines, including marine and industrial turbine engines and auxiliary power units. As shown in FIG. 1, the engine 10 has a longitudinal or axial centerline axis 12 that extends there through for reference purposes and generally along a longitudinal direction L. The engine 10 further defines a radial direction R extended from the axial centerline 12, and a circumferential direction C around the axial centerline 12. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion system 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40 such as in an indirect-drive or geared-drive configuration. In other embodiments, the engine 10 may further include an intermediate pressure (IP) compressor and turbine rotatable with an intermediate shaft.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

During operation of the engine 10, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion system 26. The now compressed air as indicated schematically by arrows 82 flows through the combustion system 26.

The engine 10 includes a fluid manifold assembly 90 generally surrounding the combustion system 26 that delivers a pressurized fluid, such as a liquid or gaseous fuel, to the combustion system 26. The fluid manifold assembly 90 is coupled to a plurality of fuel nozzles disposed through the combustion system 26 to deliver fuel into the engine 10 and mix with the compressed air 82 and ignite within the combustion system 26 to produce combustion gases as indicated schematically by arrows 86.

Referring still to FIG. 1, the combustion gases 86 generated in the combustion system 26 flow into the HP turbine 28, thus causing the HP rotor shaft 34 to rotate, thereby supporting operation of the HP compressor 24. The combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsive thrust.

Referring now to FIGS. 2-3, exemplary schematic views of the fluid manifold assembly 90 is generally provided. The fluid manifold assembly 90 includes a walled conduit assembly 100 defining a fluid passage 105 therewithin. The walled conduit assembly 100 defines at the fluid passage 105 defining a pair of ends 103 separated by a length 107. The fluid manifold assembly 90 further includes a connecting conduit 130 coupled to the end 103 and the length 107 of the fluid passage 105.

In various embodiments, the connecting conduit 130 is coupled substantially perpendicular (e.g., shown at arrow 99) to the walled conduit assembly 100 along the length 107 of the fluid passage 105. For example, the connecting conduit 130 is coupled in fluid communication to the fluid passage 105 at the end 103 of the walled conduit assembly 100. The connecting conduit 130 is further coupled in fluid communication to the fluid passage 105 along the length 107 of the walled conduit assembly 100. In various embodiments, the connecting conduit 130 is coupled to the end 103 substantially co-directional to the fluid passage 105.

In various embodiments the connecting conduit 130 may be coupled at substantially any location of the fluid passage 105 along the length 107 of the walled conduit assembly 100. For example, referring to FIG. 3, the connecting conduit 130 may be coupled in fluid communication with the fluid passage 105 at the ends 103 of the walled conduit assembly 100, such as depicted schematically at p1 and p5. In various embodiments, the connecting conduit 130 is additionally coupled in fluid communication along the length 107 of the fluid passage 105, such as proximate to p2, p3, or p4. As another example, p2 and p4 may each be defined within approximately 25% of the length 107 from the proximate ends 103 of the walled conduit assembly 100. As yet another example, p3 may be defined at approximately 50% of the length 107 from the end 103 of the walled conduit assembly 100. As such, in various embodiments, the connecting conduit 130 is coupled to the end 103 of the walled conduit assembly 100 and along the length 107 between the ends 103 of the walled conduit assembly 100.

Referring back to FIGS. 2-3, in one embodiment, the connecting conduit 130 defines at least one substantially 90 degree bend 97 between the end 103 and the portion of the length 107 of the walled conduit assembly 100 to which the connecting conduit 130 attaches. In various embodiments, the walled conduit assembly 100 defines a first diameter 109 and the connecting conduit 130 defines, at least in part, a second diameter 111. The second diameter 111 is between 0.2 and 1.5 times the first diameter 109.

In another embodiment, at least a portion of the connecting conduit 130 defines a tapered geometry 112. For example, the tapered geometry 112 at the connecting conduit 130 may define a decreasing diameter at the connecting conduit 130 toward the end 103 and/or the length 107 of the walled conduit assembly 100.

In still various embodiments, the connecting conduit 130 defines a parametric oscillator. For example, during operation of the engine 10 including the fluid manifold assembly 90, vibrations may occur due, at least in part, to the flow of fluid through the fluid passage 105. When a sufficiently high amplitude of vibration is applied from the fluid passage 105 through the connecting conduit 130 to the fluid passage 105 perpendicular to a direction of vibration at a first frequency f defining a resonant frequency, a fractions or multiples of the frequency f (e.g., f/2, f, 2f, etc.) vibration may be enabled due to the non-linear interaction of the two vibrations. For example, arrows 101 within the fluid passage 105 depict the direction of vibration defining the first frequency relative to arrows 102 depicting perpendicular direction at which the high amplitude vibration (depicting a fraction or multiple of the frequency f) is applied to the fluid passage 105. As such, fluid oscillations are communicated back into the fluid passage 105 via the connecting conduit 130 to contain or otherwise mitigate acoustic resonance in the fluid manifold assembly 90 in a non-dissipative manner.

Figure 4:
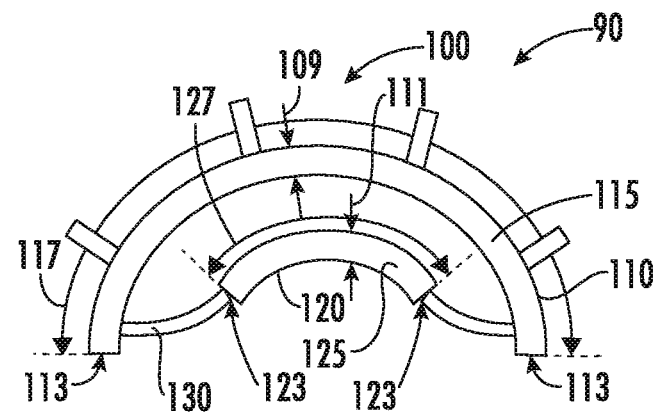
Figure 5:
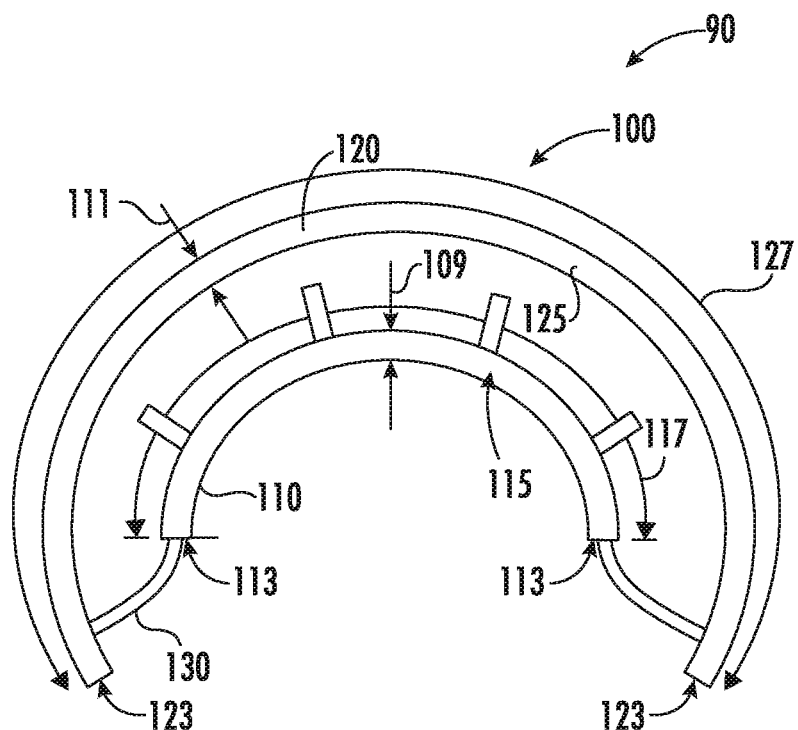
Figure 6:
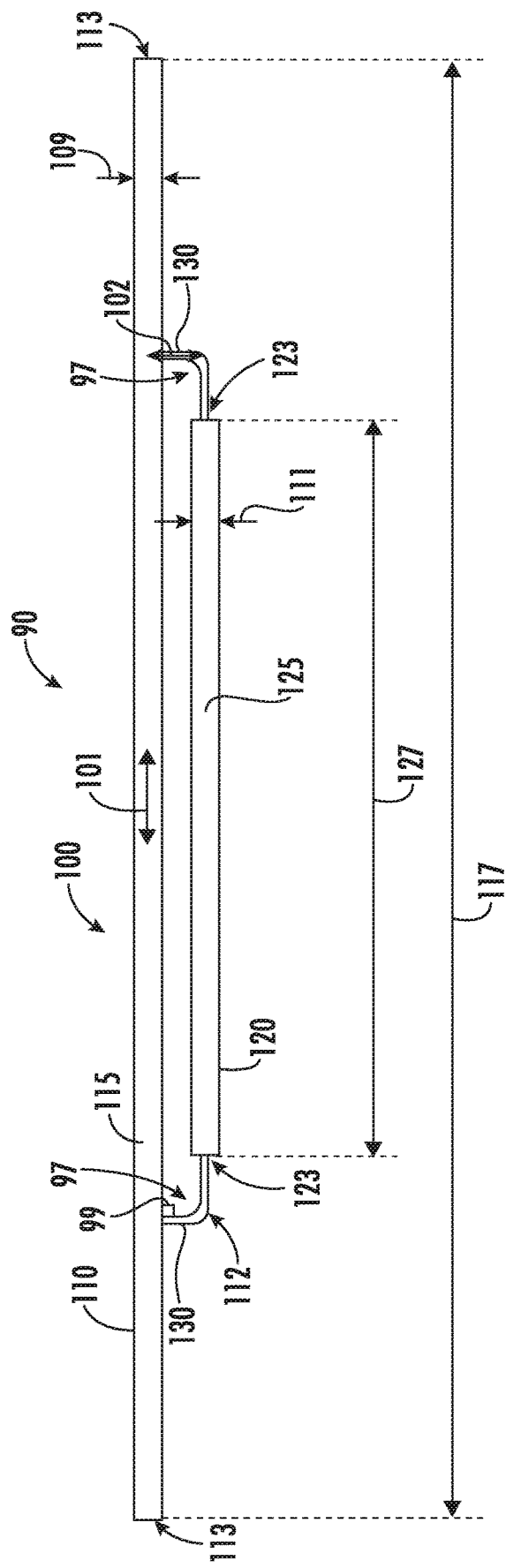

Referring now FIGS. 4-6, further exemplary embodiments of the fluid manifold assembly 90 are generally provided. The exemplary embodiments provided in regard to FIGS. 4-6 are configured substantially similarly such as described in regard to FIGS. 2-3. In regard to the embodiments generally provided in FIGS. 4-6, the walled conduit assembly 100 includes a first walled conduit 110 defining a first fluid passage 115 therewithin. The first walled conduit 110 defines at the first fluid passage 115 a pair of first ends 113 separated by a first length 117. The walled conduit assembly 100 further includes a second walled conduit 120 defining a second fluid passage 125 therewithin. The second walled conduit 120 defines at the second fluid passage 125 pair of second ends 123 separated by a second length 127.

It should be appreciated that various embodiments of the first and second walled conduits 110, 120 may be configured such as shown and described in regard to the walled conduit assembly 100 shown and described in regard to FIGS. 2-3. Furthermore, the first and second ends 113, 123 may be configured such as shown and described in regard to the ends 103 of the walled conduit assembly 100 shown and described in regard to FIGS. 2-3. Still further, the first and second lengths 117, 127 may be configured such as described in regard to the length 107 of the walled conduit assembly 100 shown and described in regard to FIGS. 2-3.

Referring still to FIGS. 4-6, the connecting conduit 130 is coupled to the first walled conduit 110 and the second walled conduit 120 in fluid communication between the first fluid passage 115 and the second fluid passage 125. In various embodiments, such as shown in regard to FIG. 4, the connecting conduit 130 is coupled to the second end 123 of the second walled conduit 120 and the first length 117 of the first walled conduit 110. In one embodiment, the first walled conduit 110 may define the first length 117 greater than the second length 127 of the second walled conduit 120. For example, the first length 117 may be two times or greater than the second length 127.

In still various embodiments, such as shown in regard to FIG. 5, the connecting conduit 130 is coupled to the first end 113 of the first walled conduit 110 and the second length 127 of the second walled conduit 120. In one embodiment, the first walled conduit 110 may define the first length 117 less than the second length 127 of the second walled conduit 120. For example, the first length 117 may be half or less than the second length 127.

Referring back to FIGS. 4-6, in various embodiments, the first walled conduit 110 defines a first diameter 109 and the second walled conduit 120 defines a second diameter 111. The second diameter 111 is between 0.2 and 1.5 times the first diameter 109.

Embodiments of the fluid manifold assembly 90 generally shown and described herein may be implemented as a liquid and/or gaseous fuel system of the combustion system 26 providing fuel to mix with the compressed air 82 to produce combustion gases 86. Other embodiments may be implemented as a liquid and/or gaseous fuel system of an inter-turbine burner (e.g., at the turbine section 31) or an afterburning exhaust or augmentor system (e.g., at the exhaust nozzle 32), such as to mix and combust liquid and/or gaseous fuel with the combustion gases 86 shown in FIG. 1. The embodiments of the fluid manifold assembly 90 generally provided may mitigate fuel coupled dynamics, thereby mitigating durability deterioration at the engine 10 and combustion system 26. The embodiments generally provided herein mitigates acoustic resonance between the fluid manifold assembly 90 and combustion dynamics at the combustion system 26 (i.e., vibrations, acoustics, noise, etc. produced during combustion of the fuel and air mixture at the combustion system 26). The embodiments of the fluid manifold assembly 90 may generally provide passive non-dissipative mitigation of acoustic resonance at different operating conditions or combustion dynamics modes (e.g., fuel/air mixtures across various pressures and/or temperatures of air 82 entering the combustion system 26).

Still other embodiments of the fluid manifold assembly 90 may be implemented at a lubricant or hydraulic system of the engine 10, or at an air or gas supply system of the engine 10 (e.g., bleed air, cooling air, damper air, etc.). As such, various embodiments of the fluid flowing through the fluid manifold assembly 90 may include a liquid or gaseous fuel, lubricants or oil-based solutions generally, hydraulic fluid, a gas (e.g., air, inert gas), water or water-based solutions, or combinations thereof.

All or part of the fluid manifold assembly 90 may be part of a single, unitary component and may be manufactured from any number of processes commonly known by one skilled in the art. These manufacturing processes include, but are not limited to, those referred to as "additive manufacturing" or "3D printing". Additionally, any number of casting, machining, welding, brazing, or sintering processes, or any combination thereof may be utilized to construct one or more portions of the fluid manifold assembly 90 separately or integrally, such as, but not limited to, the first walled conduit 110, the second walled conduit 120, and the connecting conduit 130. Furthermore, the fluid manifold assembly 90 may constitute one or more individual components that are mechanically joined (e.g. by use of bolts, nuts, rivets, or screws, or welding or brazing processes, or combinations thereof) or are positioned in space to achieve a substantially similar geometric, aerodynamic, or thermodynamic results as if manufactured or assembled as one or more components. Non-limiting examples of suitable materials include high-strength steels, nickel and cobalt-based alloys, and/or metal or ceramic matrix composites, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fluid manifold assembly, the fluid manifold assembly comprising:
   a walled conduit assembly defining a fluid passage therewithin, the walled conduit assembly comprising a first terminal end, a second terminal end, and a wall extending between the first terminal end and the second terminal end; and
   a first connecting conduit having a first end connected co-directionally to the first terminal end of the fluid passage and a second end connected at an angle to the wall of the fluid passage; and
   a second connecting conduit having a first end connected co-directionally to the second terminal end of the fluid passage and a second end connected at an angle to the wall of the fluid passage,
   wherein the fluid manifold assembly is configured to be disposed in a gas turbine engine, and
   wherein the first connecting conduit and the second connecting conduit contain or mitigate acoustic resonance in the fluid manifold assembly.

2. The fluid manifold assembly of claim 1, wherein the second end of the first connecting conduit is coupled substantially perpendicularly to the wall of the fluid passage, and wherein the second end of the second connecting conduit is coupled substantially perpendicularly to the wall of the fluid passage.

3. The fluid manifold assembly of claim 1, wherein the first connecting conduit, the second connecting conduit, or both the first connecting conduit and the second connecting conduit defines at least one substantially 90 degree bend.

4. The fluid manifold assembly of claim 1, wherein the walled conduit assembly defines a first diameter and the first connecting conduit or the second connecting conduit defines, at least in part, a second diameter, and wherein the second diameter is between 0.2 to 1.5 times the first diameter.

5. The fluid manifold assembly of claim 1, wherein the first connecting conduit or the second connecting conduit defines, at least in part, a tapered geometry defining a plurality of diameters at the respective connecting conduit.

6. The fluid manifold assembly of claim 1, further comprising a plurality of projections extending from an outer surface of the walled conduit assembly and spaced along a length of the wall of the walled conduit assembly.

7. The fluid manifold assembly of claim 1, wherein the first connecting conduit is coupled in fluid communication with the fluid passage through the first terminal end and the wall, and wherein the second connecting conduit is coupled in fluid communication with the fluid passage through the second terminal end and the wall.

8. The fluid manifold assembly of claim 1, wherein the first connecting conduit is connected to the wall at a distance defined within 25% of a length of the wall extending from the first terminal end.

9. The fluid manifold assembly of claim 1, wherein the second connecting conduit is connected to the wall at a distance defined within 25% of a length of the wall extending from the second terminal end.

10. The fluid manifold assembly of claim 1, wherein the first connecting conduit is connected to the wall at a distance defined within 50% of a length of the wall extending from the first terminal end.

11. The fluid manifold assembly of claim 1, wherein the second connecting conduit is connected to the wall at a distance defined within 50% of a length of the wall extending from the second terminal end.

12. The fluid manifold assembly of claim 1, wherein the first connecting conduit and the second connecting conduit each define a parametric oscillator.

13. A gas turbine engine, the engine comprising:
   a combustion system, wherein the combustion system comprises a fuel nozzle and a fluid manifold assembly, wherein the fluid manifold assembly provides a fuel to a combustion chamber via the fuel nozzle, the fluid manifold assembly comprising:
   a walled conduit assembly defining a fluid passage therewithin, the walled conduit assembly comprising a first terminal end, a second terminal end, and a wall extending between the first terminal end and the second terminal end; and a first connecting conduit having a first end connected co-directionally to the first terminal end of the fluid passage and second end connected at an angle to the wall of the fluid passage; and a second connecting conduit having a first end connected co-directionally to the second terminal end of the fluid passage and a second end connected at an angle to the wall of the fluid passage, wherein the first connecting conduit and the second connecting conduit contain or mitigate acoustic resonance in the fluid manifold assembly.

14. The gas turbine engine of claim 13, wherein the second end of the first connecting conduit is coupled substantially perpendicularly to the wall of the fluid passage, and wherein the second end of the second connecting conduit is coupled substantially perpendicularly to the wall of the fluid passage.

15. The gas turbine engine of claim 13, wherein the first connecting conduit, the second connecting conduit, or both the first connecting conduit and the second connecting conduit defines at least one substantially 90 degree bend.

16. The gas turbine engine of claim 13, wherein the walled conduit assembly defines a first diameter and the first connecting conduit or the second connecting conduit defines, at least in part, a second diameter, and wherein the second diameter is between 0.2 to 1.5 times the first diameter.

17. The gas turbine engine of claim 13, wherein the first connecting conduit or the second connecting conduit defines, at least in part, a tapered geometry defining a plurality of diameters at the respective connecting conduit.

* * * * *